(12) United States Patent
Menon

(10) Patent No.: US 6,601,954 B2
(45) Date of Patent: Aug. 5, 2003

(54) EYEGLASS FRAME WITH SEPARATELY INTERCHANGEABLE, SPRING-BIASED CURVED LENSES

(75) Inventor: Rémy Menon, Viry (FR)

(73) Assignee: Royal Plastic (FR)

( * ) Notice: Subject to any disclaimer, the term of this patent is extended or adjusted under 35 U.S.C. 154(b) by 0 days.

(21) Appl. No.: 09/998,963

(22) Filed: Oct. 31, 2001

(65) Prior Publication Data

US 2002/0101562 A1 Aug. 1, 2002

(30) Foreign Application Priority Data

Oct. 31, 2000 (FR) .............................. 00/14029

(51) Int. Cl.$^7$ ................................ G02C 1/00
(52) U.S. Cl. .......................... 351/86; 351/41
(58) Field of Search ............... 351/86, 85, 83, 351/103, 106, 90, 92, 41

(56) References Cited

U.S. PATENT DOCUMENTS 2,574,839 A * 11/1951 Pelzer ..................... 351/86

FOREIGN PATENT DOCUMENTS

| FR | 1380136 A | 3/1955 |
| FR | 2 615 004 A | 11/1988 |
| FR | 2 686 983 A | 8/1993 |
| GB | 2 017 332 A | 10/1979 |

* cited by examiner

Primary Examiner—Hung Xuan Dang
(74) Attorney, Agent, or Firm—Piper Rudnick LLP

(57) ABSTRACT

The invention pertains to an eyeglass frame with lenses that are interchangeable independently of each other, of the type comprising apertures for said lenses connected to each other by a bridge, as well as temples, with each of said apertures being provided at least partially on its circumferences with a groove, characterized in that said apertures are curved and in that each groove presents at least on its circumference a deepest part and a shallowest part.

10 Claims, 2 Drawing Sheets

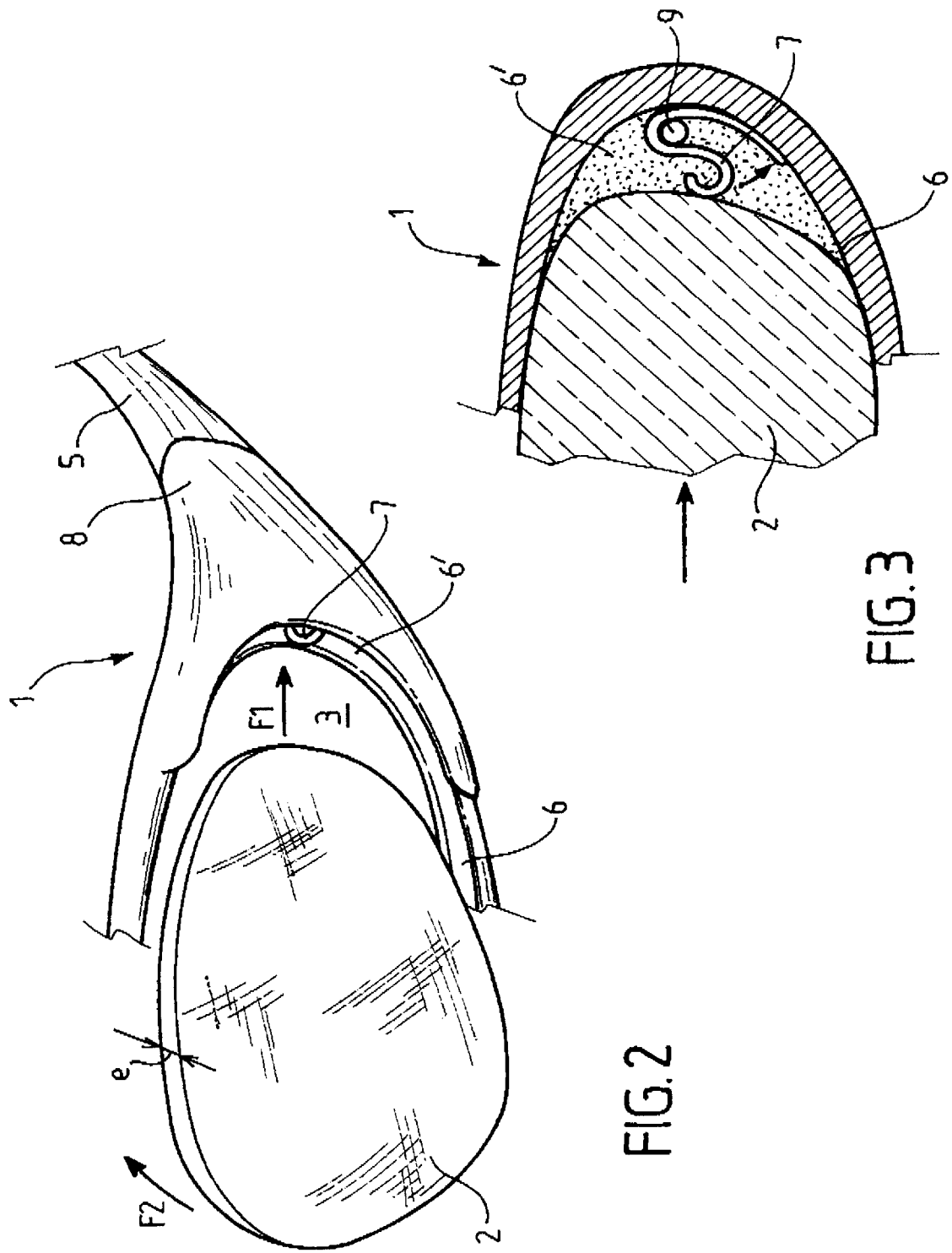

EYEGLASS FRAME WITH SEPARATELY INTERCHANGEABLE, SPRING-BIASED CURVED LENSES

FIELD OF THE INVENTION

This invention pertains to the field of eyeglass frames. More specifically, the invention pertains to an eyeglass frame with lenses that are interchangeable independently of each other, of the type comprising apertures for said lenses connected to each other by a bridge, as well as temples, with each of said apertures being provided at least partially on its circumference with a groove.

This type of frame thus makes it easy to vary the shade or color of the lenses as well as the magnification that they provide.

BACKGROUND

Already known in the art are eyeglass frames with lenses that are interchangeable independently of each other, notably French patent 2 686 983 which pertains to a frame device in which the lenses are held in the top part near the tenons by means of a girdle, with the lenses being maintained on the bridge side by metal hooks acting as springs which are also provided with girdles. The girdles have a constant thickness and the frame apertures for the lenses are planar. This frame exhibits a lateral gap through which the radiation can reach the eye on the side of the frame without passing partially or totally through the lens.

Also known in the art are curved lenses whose circumferences are not planar and which are positioned in front as well as on the sides of human vision. This type of lens is, for example, very popular for athletic activities because it makes it possible to filter out all of the solar rays that could reach the eyes.

The major disadvantage of the eyeglass frames with independently interchangeable lens of the prior art is that they cannot be used for holding the curved lenses that filter out all of the radiation and, therefore, do not have planar circumferences.

SUMMARY OF THE INVENTION

This invention relates to an eyeglass frame with lenses that are interchangeable independently of each other, including apertures for said lenses connected to each other by a bridge, temples extending from the frame, with each of the frame apertures being provided at least partially on its circumferences with a groove, wherein the apertures are curved and each groove at least on its circumference a deepest part and a shallowest part.

This invention also relates to eyeglasses including a frame including a pair of rims curved to generally correspond to a wearer's facial shape, each rim having an opening, a bridge connecting the rims, and a temple arm pivotably connected to each rim, and a lens sized and shaped to releasably fit in each opening, wherein each rim has a groove sized and shaped to receive one of the lenses, each groove having a deep end portion and a shallow end portion.

BRIEF DESCRIPTION OF THE DRAWINGS

Better comprehension of the invention will be obtained from the description below of one mode of implementation of the invention which is presented for purely explanatory purposes with reference to the attached figures:

FIG. 2 shows, in a perspective view, a detail of the eyeglass frame according to the invention, and FIG. 3 shows, in a sectional view, the deepest part of a groove in which a lens is mounted.

DETAILED DESCRIPTION

Figure 1:
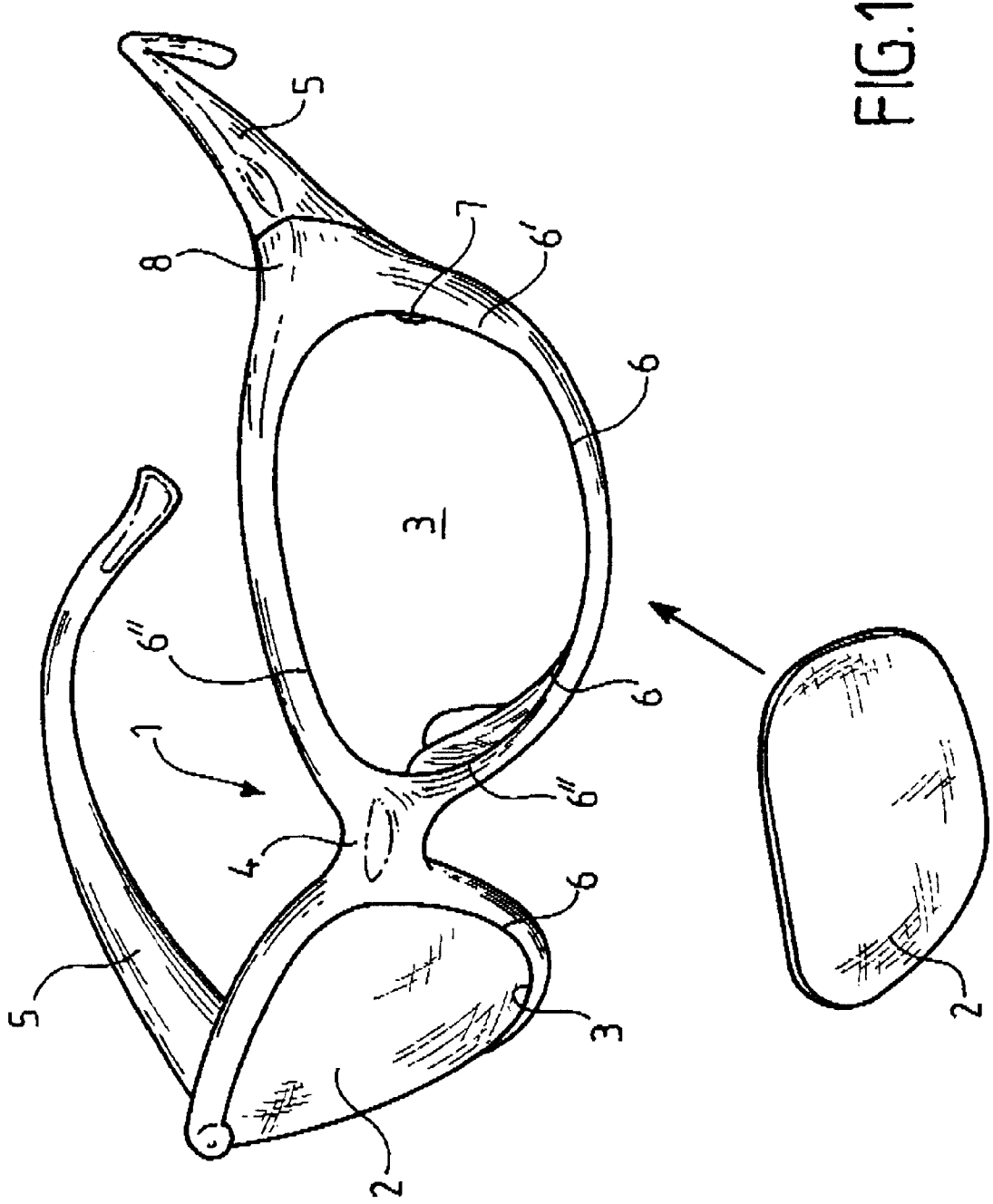
FIG. 1 shows, in a perspective view, an eyeglass frame according to the invention.

This invention resolves the disadvantages of the prior art by providing an eyeglass frame that makes it possible to mount curved lenses and which does not exhibit a lateral gap. To achieve this, the invention is remarkable in its broadest sense in that the frame apertures for the lenses are curved and in that each groove presents at least over its circumference a deeper part and a shallower part.

The term "curved frame aperture" is understood to mean an aperture whose circumference is not planar in the vertical direction and which makes it possible to install lenses which come to be positioned both in front of and on the sides of the vision of the wearer.

For better gripping of the lens, the deepest part is positioned essentially opposite the shallowest part on the circumference of the lens aperture. The deepest part is provided with at least one spring means and it is preferably located close to the temple tenons or close to the bridge. The shallowest part has a height equal approximately to the thickness of the lens and the deepest part has a height equal to at least about twice the thickness of the lens. The curved lens is thus held in its curved aperture by being pinched in the deepest part and in the shallowest part of the groove. The lens can, of course, be mineral or synthetic.

Thus, the invention advantageously enables creation of an eyeglass frame with lenses that are interchangeable independently of each other, which is well adapted to the curvature of the face and the lenses of which extend to the lateral part of the vision of the wearer.

Turning now to the drawings, the eyeglass frame (1) according to the invention, shown in FIG. 1, is an eyeglass frame for lenses (2) which are interchangeable independently of each other. The frame is of the type comprising apertures (3) for lenses (2), which apertures are connected to each other by a bridge (4), as well as temples (5), with each of apertures (3) being provided at least in part with a groove along its circumference (6).

The eyeglass frame (1) is characterized in that apertures (3) are curved and in that each of the grooves (6) present on its circumference has at least one deepest part (6') and one shallowest part (6").

The deepest part (6') is located essentially opposite the shallowest part (6") on the circumference of the frame aperture to enable the pinching and firm maintenance in position of the curved lens (2). The deepest part (6') is provided with at least one spring (7) such that the spring provides for maintenance in position of the lens (2) in the frame aperture (3). The deepest part (6') is preferably located close to the tenons (8) of the temples (5), as shown in FIG. 2. However, it can also be located close to the bridge (4) or at another site.

In a preferred version of the invention, the shallowest part (6") has a height equal approximately to the thickness "e" of the lens (2) and said deepest part (6') has a height equal to at least about twice the thickness "e" of the lens (2). The spring (7) is preferably constituted by a curved strip held inside deepest part (6') by a retainer (9) as shown in FIG. 3. However, it is also possible that the spring (7) is constituted by a helical spring.

Mounting the lenses (2) on the eyeglass frame (1) is extremely simple: it is merely necessary to position the corresponding end of the lens (2) in the deepest part (6') of the girdle (6), then to push along the arrow F1 on the lens (2) so as to compress the spring (7), and then to push along the arrow F2 on the lens (2) to pinch it in the shallowest part (6") of the girdle (6). The lens (2) of curved shape is, thus, maintained in the frame aperture (3).

What is claimed is:

1. An eyeglass frame with lenses that are interchangeable independently of each other, comprising apertures for said lenses connected to each other by a bridge, temples extending from said frame, with each of said frame apertures being provided at least partially on its circumferences with a groove, wherein apertures are curved and each groove defines a deepest part and a shallowest part and further comprising a spring located at the deepest part of each groove and positioned to bias a corresponding lens toward a corresponding shallowest part to maintain said lens in a desired position in said aperture.

2. The eyeglass frame according to claim 1, wherein said deepest part is located essentially opposite the shallowest part on the circumference of the aperture.

3. The eyeglass frame according to claim 1, wherein said deepest part is located close to tenons of the temples.

4. The eyeglass frame according to claim 1, wherein said deepest part is located adjacent to the bridge.

5. The eyeglass frame according to claim 1, wherein said shallowest part has a height equal approximately to thickness of the lens and said deepest part has a height equal to at least about twice the thickness of the lens.

6. The eyeglass frame according to claim 1, wherein said spring is constituted by a curved strip held inside said deepest part by a retainer.

7. Eyeglasses comprising:

a frame including a) a pair of rims curved to generally correspond to a wearer's facial shape, each rim having an opening, b) a bridge connecting the rims, and c) a temple arm pivotably connected to each rim;

a lens sized and shaped to releasably fit in each opening, wherein each rim has a groove sized and shaped to receive one of said lenses, each groove having a deep end portion and a shallow end portion, and a spring located at the deep end portion of each groove and positioned to bias the corresponding lens toward a corresponding shallow end portion to maintain said lens in a desired position in said opening.

8. The eyeglass of claim 7, wherein said spring is a curved strip held inside said deepest part by a retainer.

9. The eyeglasses of claim 7, wherein the deep end portions are located adjacent the bridge.

10. The eyeglasses of claim 7, wherein said shallowest part has a height equal approximately to the thickness of the lens and said deepest part has a height equal to at least about twice the thickness of the lens.

* * * * *